(12) United States Patent
Moerbeek

(10) Patent No.: US 6,418,445 B1
(45) Date of Patent: Jul. 9, 2002

(54) SYSTEM AND METHOD FOR DISTRIBUTED DATA COLLECTION AND STORAGE

(75) Inventor: Otto Moerbeek, Amsterdam (NL)

(73) Assignee: Perot Systems Corporation, Dallas, TX (US)

( * ) Notice: Subject to any disclaimer, the term of this patent is extended or adjusted under 35 U.S.C. 154(b) by 0 days.

(21) Appl. No.: 09/070,090

(22) Filed: Apr. 30, 1998

Related U.S. Application Data

(60) Provisional application No. 60/077,140, filed on Mar. 6, 1998.

(51) Int. Cl.[7] .............................................. G06F 17/30
(52) U.S. Cl. ...................... 707/103 X; 707/3; 709/201; 709/223
(58) Field of Search ..................... 707/103, 10, 1, 707/9, 103 R, 103 Y, 103 Z; 709/201, 223

(56) References Cited

U.S. PATENT DOCUMENTS

| | | | | |
|---|---|---|---|---|
| 5,237,654 A | * | 8/1993 | Shackelford et al. | 345/357 |
| 5,421,012 A | * | 5/1995 | Khoyi et al. | 709/107 |
| 5,432,932 A | | 7/1995 | Chen | 709/650 |
| 5,535,335 A | * | 7/1996 | Cox et al. | 709/221 |
| 5,638,514 A | | 6/1997 | Yoshida et al. | 709/224 |
| 5,655,081 A | | 8/1997 | Bonnell et al. | 709/202 |
| 5,724,426 A | * | 3/1998 | Rosenow et al. | 713/167 |
| 5,761,674 A | * | 6/1998 | Ito | 707/104 |
| 5,778,367 A | * | 7/1998 | Wesinger, Jr. et al. | 707/10 |
| 5,802,518 A | * | 9/1998 | Karaev et al. | 707/9 |
| 5,918,009 A | * | 6/1999 | Gehani | 395/187.01 |
| 5,918,223 A | * | 6/1999 | Blum et al. | 707/1 |
| 5,937,163 A | * | 8/1999 | Lee et al. | 395/200.48 |
| 5,987,480 A | * | 11/1999 | Donohue et al. | 707/501 |
| 6,038,567 A | * | 3/2000 | Young | 707/103 |
| 6,091,893 A | * | 7/2000 | Fintel et al. | 395/500 |

FOREIGN PATENT DOCUMENTS

| | | |
|---|---|---|
| EP | 0668564 | 8/1995 |
| EP | 0822498 | 2/1998 |

OTHER PUBLICATIONS

Catania V. et al: "A Tool to Monitor Performances in Distributed Systems" Proceedings of the International Symposium of High Performance Distributed Computing, Aug. 2, 1994, pp. 279–386, XP000672376.

* cited by examiner

Primary Examiner—John Breene
Assistant Examiner—Cheryl Lewis
(74) Attorney, Agent, or Firm—Jenkens & Gilchrist

(57) ABSTRACT

A system and method for automatically and adaptively capturing, recording, and retrieving large amounts of complex Information Technology (IT) system component state data in a distributed, hierarchical manner. Monitored components include virtually any element in an IT system, including hardware, e.g., routers, hard drives, etc., and software, e.g., databases, operating system, kernels, etc. In a preferred embodiment, collection and storage elements, or objects, are logically arranged in a hierarchical manner such that data collected may be propagated up in the hierarchy. Similarly, querying of such data is performed in a hierarchial manner, e.g., queries are propagated down and results propagated up. Propagation of collected data through the storage system is performed in a manner to optimize system performance. Uniformity in the collection and storage scheme allows easy expansion of the collection and storage system, and thus the underlying IT system infrastructure.

54 Claims, 8 Drawing Sheets

SYSTEM AND METHOD FOR DISTRIBUTED DATA COLLECTION AND STORAGE

The present application is the subject of U.S. provisional application Ser. No. 60/077,140 filed Mar. 6, 1998.

BACKGROUND OF THE INVENTION

1. Technical Field of the Invention

The present invention relates to complex information technology systems (IT) and, in particular, to a system and method for retrieving, storing and propagating data indicative of system component states.

2. Background and Objects of the Invention

With the increasing use of computers, particularly personal computers (PCS), both in business and in the home, computers have become an integral tool of most information technology (IT) workers in a wide variety of fields. Another technological development facilitating the pervasiveness of computers in society is the growing interlinkage of computers, either locally in a Local Area Network (LAN) and/or remotely, such as through dedicated lines or via the World-Wide Web or Internet.

As networks of computers and peripheral devices grow in size and the interlinkages multiply, however, inter-component incompatibilities arise, manifesting themselves in a variety of ways, both obvious and subtle. To analyze the behavior of the various interacting resources within an IT system, large amounts of monitoring data are needed to duplicate or model system state conditions. Armed with sufficient monitoring data, a system administrator can model particular system state behaviors to analyze component failures and the reasons therefor, as described in assignee's co-pending patent applications entitled "System and Method for Generating Performance Models of Complex Information Technology Systems", U.S. Ser. No. 09/036,393U.S. Pat. No. 6,311,175, filed Mar. 6, 1998, and "System and Method for Model Mining Complex Information Technology Systems", U.S. Ser. No. 09/036,394pending filed Mar. 6, 1998, both of which are and incorporated herein by reference.

As set forth in more detail in the aforedescribed co-pending patent applications, various system characteristics may be examined and performance data generated therefrom. For example, in a large network of computers and peripherals, some key characteristics include network bandwidth, processor speed, memory, database query speed, etc. Since large amounts of such data measurements are necessary to adequately model system (or subsystem) performance, one problem with existing monitoring or measuring techniques is that the data collection mechanism itself consumed significant resources, interfering with system operation and, therefore, skewing the data measurements.

It is, accordingly, an object of the present invention that the acts of data measurement consume minor amounts of resources and, therefore, influence the system monitoring as little as possible.

It is also an object of the present invention to provide an adaptable monitoring and data collection system and method so that new components may be more easily integrated (and old ones removed) into the existing system.

It is another object of the present invention to provide a robust monitoring and data collection system and method which continues to operate despite failures in various subsystems.

It is a further object of the present invention that the system and method collect time-related system state data in a computer network from a variety of different types of system components.

It is a still further object of the present invention that the system and method store the same aforementioned monitoring data in a variety of storage facilities, preferably storing the data in a consistent record structure.

It is another object of the present invention that the system and method record and store computer network component time-related state data in a flexible manner, optimizing the collection and storage of such data.

It is yet another object of the present invention that the system and method record and store the aforementioned computer network component time-related state data across components in a modular manner, such that loss of specific components does not impair the functionality of other components holding the data.

It is a still further object of the present invention that the system and method record and store the computer network component time-related state data in a manner allowing scalability, so that overall system effectiveness is not governed by the size or complexity of the underlying system infrastructure.

It is another object of the present invention that the system and method record and store the aforementioned computer network component time-related state data such that effective means for querying the stored state data is not a condition of knowledge of the manner in which queried data is collected or stored.

SUMMARY OF THE INVENTION

The present invention is directed to a system and method for automatically and adaptively capturing, recording, and retrieving large amounts of complex Information Technology (IT) system component state data in a distributed, hierarchical manner. Monitored components include virtually any element in an IT system, including hardware, e.g., routers, hard drives, etc., and software, e.g., databases, operating system kernels, etc. In a preferred embodiment, collection and storage elements, or objects, are logically arranged in a hierarchical manner such that data collected may be propagated up in the hierarchy. Similarly, querying of such data is performed in a hierarchial manner, e.g., queries are propagated down and results propagated up. Propagation of collected data through the storage system is performed in a manner to optimize system performance. Uniformity in the collection and storage scheme allows easy expansion of the collection and storage system, and thus the underlying IT system infrastructure.

BRIEF DESCRIPTION OF THE DRAWINGS

A more complete understanding of the system and method of the present invention may be had by reference to the following detailed description when taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As discussed, when considering a large, inter-linked network of computers, routers, and many other devices, each of which run various applications thereon, numerous system resources are consumed, e.g., network bandwidth, processor cycles, memory, etc. At a higher level of system usage, applications utilize databases, shared file systems and other resources. The inter-relations between the myriad components, i.e., the behavior of the total system (or portions thereof) are complicated and difficult if not impossible to predict. To study such a complex IT system, large amounts of time-related monitoring data must be collected, preferably on an automatic basis and stored for analysis. It should be understood that the monitoring data can originate from reading existing statistics, e.g., by querying Simple Network Management Protocol (SNMP) agents, or from taking direct measurements.

Figure 1:
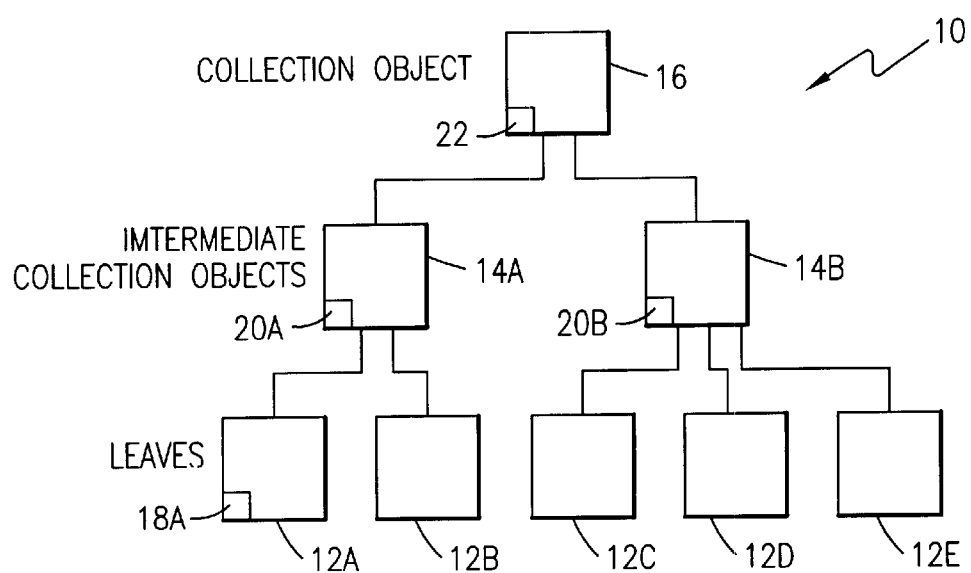
FIG. 1 is an example hierarchial arrangement of Collection Objects which are used in one embodiment of the present invention.

With reference now to FIG. 1 of the drawings, there is shown a sample tree, designated generally by the reference numeral 10, having a number of nodes therein, each generally referred to herein as a collection object (CO) and each generally representing a hardware component or software application used to collect data. As is apparent from FIG. 1 and inherent in a tree-type structure, the respective nodes are arranged hierarchically, which is a preferred embodiment of the present invention. At the lowest level or tier, i.e., a leaf level, the individual leaf nodes or collection objects, designated by the reference numerals 12A–E, retrieve the aforementioned data by taking measurements, e.g., by executing programs to collect the data or by reading statistics, such as SNMP or operating system kernel statistics.

At an intermediate level or tier, the individual collection objects, designated within FIG. 1 by the reference numerals 14A and 14B, retrieve data from the collection objects below them in the tree hierarchy, i.e., CO 14A from COs 12A and 12B, and CO 14B from COs 12C–E, respectively. Similarly, at the top level or tier, a root node 16 collects data from all of the lower-level nodes, i.e., directly from the intermediate COs 14A and 14B and indirectly from the leaf COs 12A–E. It should be understood that multiple intermediate level nodes may be employed in such a hierarchical manner.

Although the preferred node topology is tree-shaped or hierarchical, it should be understood that the system and method of the present invention may be adapted for different topologies pursuant to other methodologies. For convenience and ease of discussion, however, only tree-shaped, hierarchical structures such as shown in FIG. 1 will be described hereinafter.

Collection Objects used in practicing the system and method of the present invention include a variety of physical and logical devices, which run within an existing computer network and other communication devices. For example, the leaf node collection objects 12A–E may periodically launch programs to ascertain disk space availability on respective servers, returning time-dependent percentage values for the servers. This periodic data sampling is preferably stored in a memory, file or database, e.g., memory 18A in CO 12A. After a given time interval, which may be predetermined, contingent upon particular events or random, the stored data is propagated upward, e.g., from CO 12A to CO 14A.

It should be understood that all of the collection objects have substantially the same capabilities despite their physical and logical differences: retrieve data from a target, which may be another CO in the case of a non-leaf node, store the data and potentially propagate the data. It should therefore be understood that the internal or parent COs 14A, 14B and 16 operate substantially the same as the aforedescribed leaf COs 12A–E, i.e., collecting data from their respective children, and possibly performing additional operations on the gathered data. With reference again to FIG. 1 for example, intermediate CO 14A may compute the total disk space availability among its children COs, i.e., COs 12A and 12B. Alternatively, CO 14A may compute an aggregate value of a series of stored data, e.g., the number of database queries, or a minimum, maximum, average, etc. of the values stored in a given CO, all of its children COs or a combination of COs. In a preferred implementation where a large amount of data is collected, all of the collected and stored data is not necessarily propagated upwards from the lower-level subservient COs or kept for future use. Instead, resources at each level may be optimized by storing only the most recently collected data at the leaf COs and only averages thereof propagated upwards.

Figure 2:
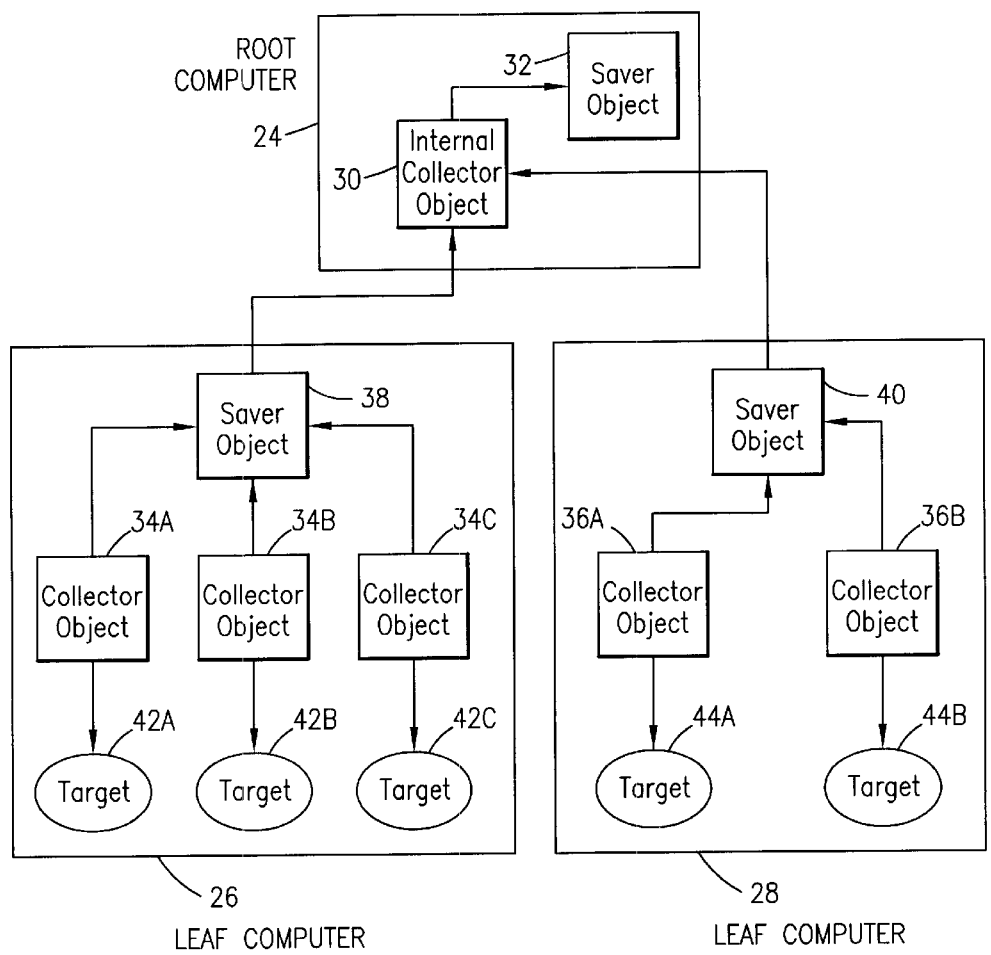
FIG. 2 is an example configuration of Collector and Saver Objects within the Collection Objects shown in FIG. 1.

It should be understood that in preferred embodiments of the present invention each component is modelled from the field of distributed object computing and each performs a specific, well-defined task. The components or objects, i.e., the COs, communicate by message exchange, also known as calling a method of an object. In this manner, messages may be sent to objects running on different computers connected via a network, such as illustrated in FIG. 2 and discussed further herein.

When analyzing performance criteria pertaining to the data stored in the COs, queries are preferably first directed to the highest level, i.e., the root node or CO 16 in the tree structure shown in FIG. 1. For example, a query on the amount of system disk space availability may be available in a memory 22 within the root CO 16 itself and computed directly. If not, the query may be forwarded to respective COs therebelow, e.g., to a memory 20A in CO 14A and a memory 20B in CO 14B to ascertain the requisite information for the query, the sum being the requested value. It should, of course, be understood that the root CO 16 may contain a partial answer and a further query may be made to either of COs 14A and 14B to complete the needed information, the partial results being combined at the root CO 16. Likewise, if further information is required, the query could interrogate one or more of the leaf COs 12A–E (and respective memories 18 therein) to obtain the pertinent information.

In view of the hierarchial data structure illustrated in FIG. 1, it should be understood that when the requisite information for a query is stored or cached at the root CO 16, minimal query time is achieved. For example, the root CO 16 may contain therein, e.g., in the memory 22, the desired disk space availability information without resort to further queries downward and consequent delay. The cost for achieving such enhanced performance, however, is increased usage of storage space within the memory 22 of the root CO 16, and the cost of the network and processing bandwidth for periodically propagating that information to the root node. Conversely, resources in the upper levels of the tree are not consumed if no collected data samples are propagated, i.e., the data stays resident in the respective leaf COs 12A–E, such as in memory 18A, or in the intermediate COs 14A and 14B. It should, of course, be understood that the response times to the aforementioned query to root CO 16 will be longer since the query must be propagated down to the leaves 12A–E and the answers percolate back up.

Through balancing the data within the respective multi-level COs and determining which data to store and which to propagate, system resources (network, storage and computational power) and performance at both data collection and query time may be optimized. Furthermore, by organizing the informational data collection and propagation to avoid potential performance bottlenecks and wide dependencies, subsystem failures of a particular leaf CO 12 or intermediate CO 14 need not incapacitate the entire network, allowing the system to continue operations despite particular component problems.

With reference now to FIG. 2, there is illustrated a preferred embodiment of the aforedescribed collection objects as used in an interlinked network of three computers, generally designated by the reference numerals 24, 26 and 28. As shown in the figure, computer 24, which may be termed herein a root computer, is connected to two child or leaf computers 26 and 28, corresponding to the aforedescribed tree nomenclature discussed in connection with FIG. 1. In a preferred embodiment of the present invention, computer 24 includes therein an internal collector object 30 and a saver object 32, the parameters and functionality of which are described in more detail hereinafter. A collection object in a preferred embodiment of the present invention contains at least one (plurality) of discrete collector objects and one saver object. Computers 26 and 28 include therein respective collector objects 34A–C, 36A and 36B and saver objects 38 and 40, respectively. As shown in the figure, collector objects 34A–C share saver object 38 and collector objects 36A and 36B share saver object 40. Five targeted attributes to be monitored are illustrated, i.e., targets 42A–C, 44A and 44B, each of which monitor respective device attributes or characteristics, and each of which are, in turn, monitored by the aforementioned respective collector objects 34A–C, 36A and 36B, which collect sample data from the respective targets 42A–C, 44A and 44B.

As shown in FIG. 2, target data from the respective targets are sampled by the appropriate collector object monitoring that target, e.g., CO 34C sampling target 42C. The targeted attributes being monitored may include disk space availability, as discussed above, database query response time, number of hard disk accesses on a given server, a router's throughput and many other system and component performance criteria. The acquired data samples propagate up from a particular target to the collector object and the saver object associated therewith. For example, in computer 26 a target value for target 42A propagates up (through collector object 34A) to the associated saver object 38, which in turn is monitored by the internal collector object 30 of computer 24 and the sampled data may pass thereto from the saver object 38. Finally, the internal collector object 30 of computer 24 may pass the data on to the saver object 32 therein.

It was earlier discussed that the targeted attribute to be monitored with a collection object may be any number of performance values. It is therefore apparent that the Collector Objects monitoring these events will have differing functionalities, these functionalities governed by the targeted attribute for which the given Collector Object is designed to monitor.

Figure 3:
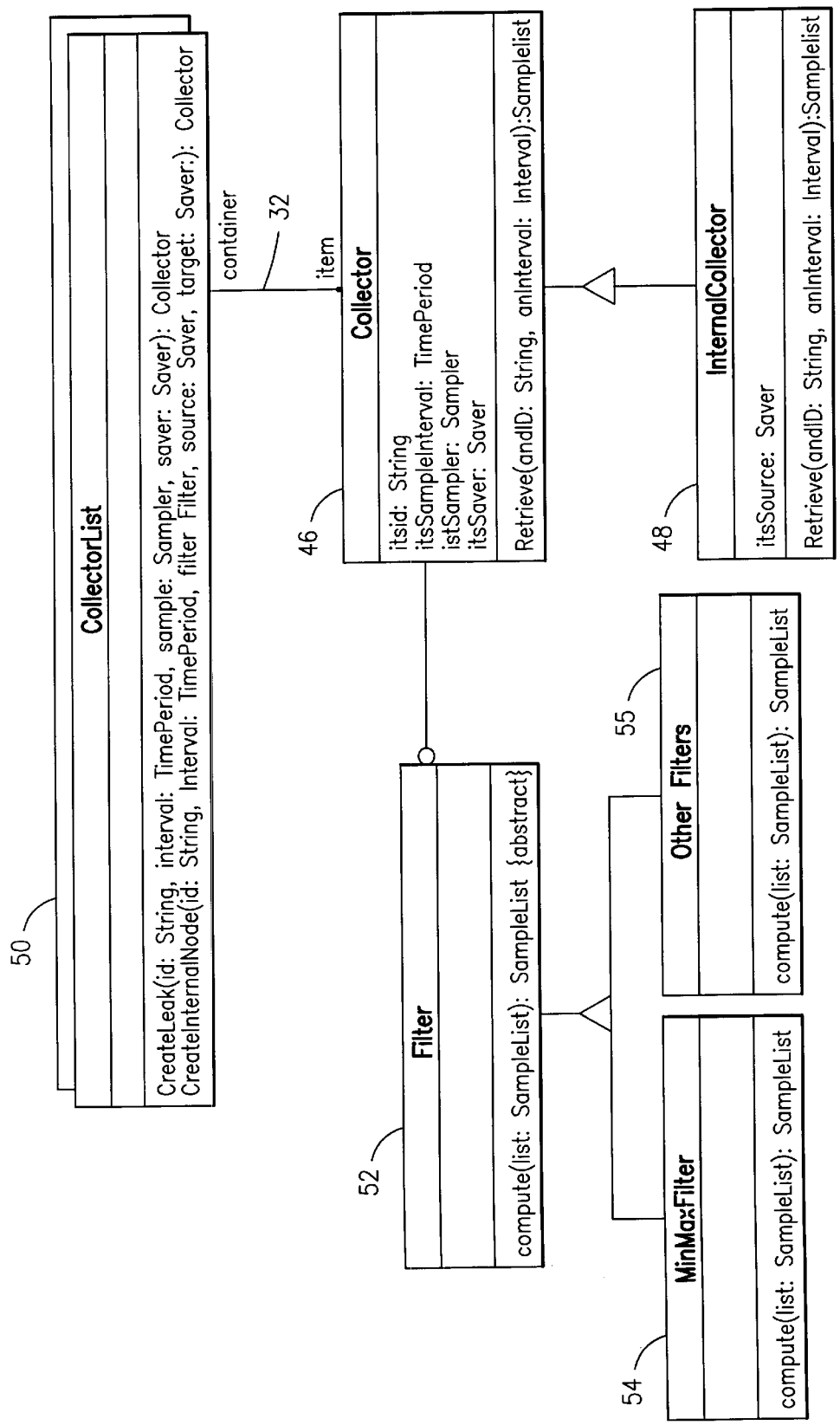
FIG. 3 is a detailed characterization of a Collector Object and other objects classified according to functionality.

With reference now to FIG. 3, there is shown a particular Collector Object 46 with a more detailed characterization of how it is defined and classified according to its functionality. Collector Object 46 is shown in FIG. 3 along with its associated components. The class or group of components uniquely defines a specific class of object. For example, in a preferred embodiment, the components defining the collector object 46 are itsID, itsSampleInterval, itsSampler, and itsSaver, the latter of which is an identifier stored within the Collector Object 46 that records which saver object the collected data will be sent to and stored within. Another member of the collector class depicted in FIG. 3 and shown in Collector Object 46 is the collector identifier, entitled itsId, which is a unique string labeling a specific Collector Object. Another member of the collector class, itsSampleInterval, specifies the time interval over which samples are to be recorded at the target, which may constitute either a real number or integer value, which value may be used as a counter between consecutive collection/storage events. The final member of the collector class is itsSampler, which denotes the Sampler Object that actually samples the raw system data. It is important to note that the respective collector objects do not actually sample the data itself, and the collector and saver objects may often be considered as one object for simplicity of discussion. A Retrieve function is also defined for the Collector Object 46 by which a SampleList of data is acquired.

With further reference to FIG. 3, there is shown an Internal Collector Object 48, which is derived from the aforedescribed Collector Object 46, such as may be used with the Internal Collector Object 30 in FIG. 2. As shown in FIG. 3, a member, or element, of the Internal Collector Object 48 is labeled itsSource, which is of type Saver, referring to the source Saver Object from which the Internal Collector Object 48 extracts data using the aforementioned Retrieve function. For example, in the Internal Collector Object (ICO) 30 shown in FIG. 2, the itsSource member of ICO 30 references Saver Object (SO) 38 or Saver Object 40 since SO 38 and SO 40 contain the sampled data which the Internal Collector Object 30 is responsible for propagating upward to the root SO 32. Therefore, the value assigned to itsSource in the ICO 30 would be a unique identifier of one of the Saver Objects 38 or 40.

With reference again to FIG. 3, a container class, denoted CollectorList 50, is also illustrated. The CollectorList 50 is responsible for holding a group of collector objects, requiring a number of associations between a single CollectorList and multiple Collector Objects. The CollectorList is also responsible for the creation of the aforedescribed Collector Objects and Internal Collector Objects by use of its own functional members, CreateLeaf and CreateInternalNode. The CreateLeaf function of the CollectorList 50 creates leaf collector objects. CreateLeaf inputs enabling creation of a leaf Collector Object, i.e., a Collector 46, include: a Collector Object name or identifier (itsID), an interval over which the Collector Object is to sample data from its target (itsSampleInterval), a specified Sampler Object (itsSampler), and a Saver Object to which the Collector Object stores its sampled data (itsSaver).

The CreateInternalNode member of the CollectorList 50 is responsible for creating Internal Collector Objects, such as ICO 30 in FIG. 2, where the Internal Collector Object is distinguished from the Collector Object in that the Internal Collector Object takes an intermediate position within the hierarchy of Collector Objects while those objects specifically referred to as Collector Objects take position as a leaf within the hierarchy, as described hereinbefore in connection with FIGS. 1 and 2. CreateInternalNode member inputs for the creation of the aforementioned Collector Object 46 include: the Collector Object Name (itsID), sample interval (itsSampleInterval), the designated Sampler Object (itsSampler), a Saver Object to which sampled data is to be saved (itsSaver) and a Saver Object from which the sampled data is from (itsSaver), and an optional Filter Object 52 through which sampled data may be filtered before saving to the Saver Object.

The association of the Filter Object 52 with the Collector Object is also illustrated in FIG. 3. A given Collector Object 46 may have either zero or one associations with a given Filter Object 52. The filter class shown in FIG. 3 is the base class from which potentially numerous filter classes may be derived, only one of which, a MinMaxFilter class 54, is illustrated. In general, a filter object computes a new list of data from a given input of sampled data. In other words, at times it may be more advantageous to store (in Store Objects) aggregation functions or the like of the sampled data rather than the raw sampled data itself, which could consume large amounts of storage. A filter object may, therefore, be used to meet this need. The MinMaxFilter 54 shown in FIG. 3 may, for example, compute the minimum and maximum values from a data sample. Other common filters used may include filters to convert the sampled data into average values, median values, modal values, or any other numerical derivative, as generally illustrated by an alternative filter 55 in FIG. 3.

The funtionability of a leaf Collector Object may be better understood with inspection of the following pseudo-code for such an object:

```
while true
begin
    sleep (itsInterval);
    val=itsSampler.TakeSample( );
    Sample sample=(itsID, currentTime, val);
    itsSaver.Store(sample);
end
```

Figure 4:
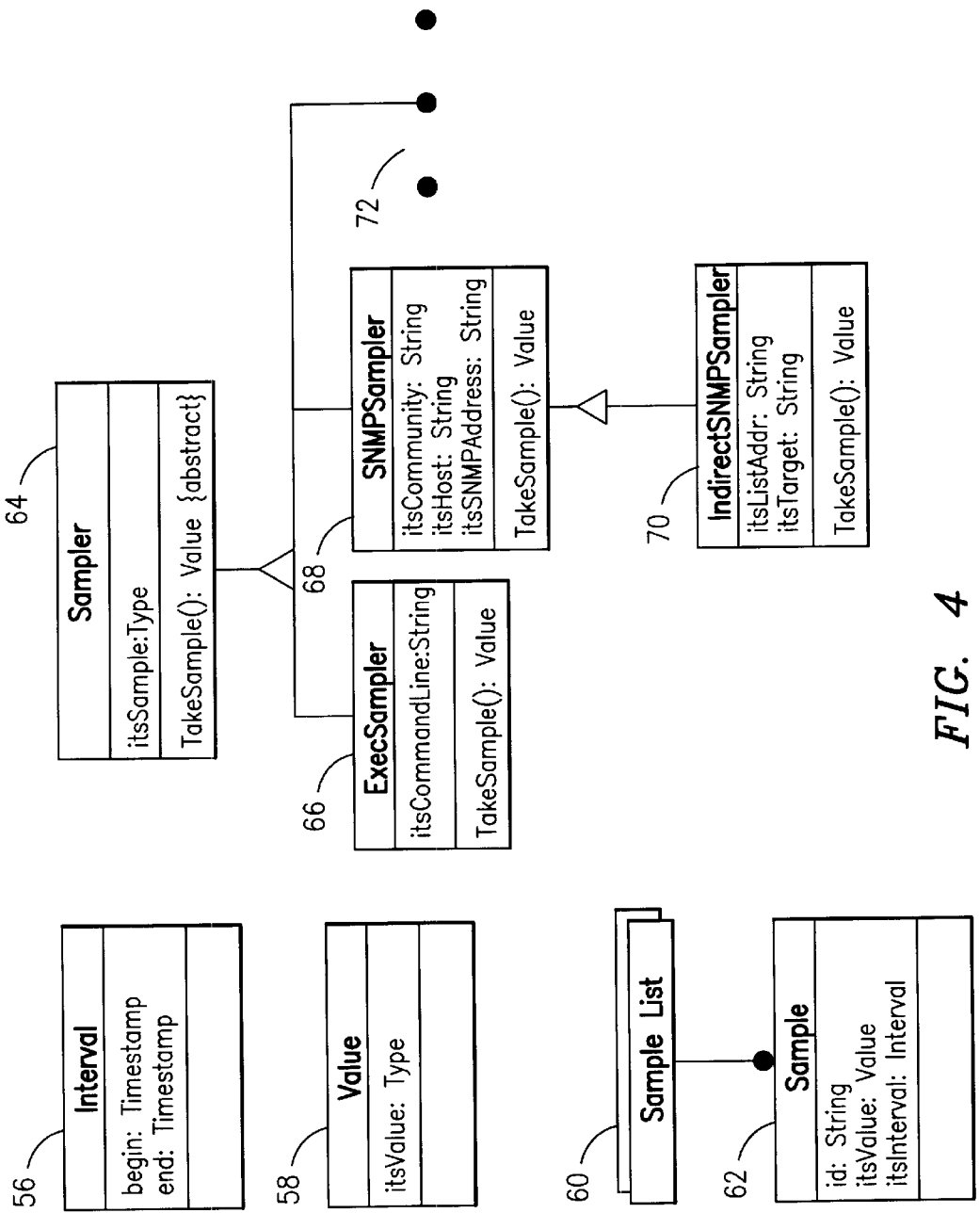
FIG. 4 illustrates an exemplary Sampler Object class and other classes with associated functionality.

As set forth in the above pseudo-code, the Collector Object will sleep, or remain idle, during the time interval ItsInterval, which has preferably been set to the desired sampling period of the specific Collector Object. When this interval expires, itsSampler takes a dedicated sample and assigns this value to the variable val. The next step of the example code attaches the Collector Object unique identifier (itsID) and the time of the sampling (currentTime) event to the sampled data val. These combined values are then stored in an object of type Sample 62, which is an aggregate of an id of type string, itsValue of type Value 58 and itsInterval of type Interval 56, as illustrated in FIG. 4.

The attachment of such delimiting information for the sample value may be accomplished by any number of common methods, including the use of a relational database or array storage techniques, as is understood in the art. The sampled value val with the attached information is then assigned to the array type variable sample and subsequently stored in member itsSaver. Such a cycle would complete and repeat after a duration defined in the sampling interval itsInterval with each subsequent sample given a new record in a database in the appropriate storage device.

Example pseudo code for the exemplary operation of an internal node, such as the Internal Collector Object 30 in FIG. 2, is given below:

```
while true
do
    sleep (itsInterval);
    if (this internal node has a Filter object) then begin
        itsSaver.StoreRows(
            itsFilter.compute(
                itsSource.Retrieve(itsID, forever-interval)));
    end
    else begin
        itsSaver.StoreRows(itsSource.Retrieve(itsID,
            forever-interval));
    end
    itsSource.ClearRows(itsID, 0);
end
```

In this example, the ICO sleeps for an itsInterval length of time.

With reference again to FIG. 4, there is illustrated exemplary Sampler classes and associated classes, such as used in FIG. 3. For example, the Interval class 56 used in CreateInternalNode has two numerical members, begin and end, both of type Timestamp, which in this exemplary embodiment is a 32-bit unsigned integer used to measure a number of seconds relative to a specific point in time; however, the exact format, whether signed or unsigned and the precise number of bits is inconsequential with regard to the scope of the present invention so long as the Timestamp type is useful for measuring elapsed time durations.

With further reference to FIG. 4, the Value class 58 has a member itsValue of type Type, which is a union type data that can be assigned any basic Simple Network Management Protocol (SNMP) value, i.e., string, integer, counter, gauge, etc., and the additional values of Null indicating absence of an assigned value, a boolean value, indicating a true or false condition, or float, indicating, in the exemplary embodiment, a 32-bit floating point number.

A SampleList class 60 is a container class containing objects of the type Sample 62, also shown in FIG. 4, which essentially contains three separate values concurrently, as previously discussed: an identification of type String (id), a value of type Value (itsValue) obtained from the actual sampling of a target component, and an interval of type Interval (ItsInterval). The identification of a monitor, a Collector Object/Sample Object combination, is designated with a string containing the path name of the monitor, this path name defined by the monitor location within the collection hierarchy. Such a method is well known and similar to methods in which directories and files are named in a file system such as a Unix file system and merits no further discussion herein.

A Sampler class 64 depicted in FIG. 4 is the Sampler base class. One method is defined in the given sampler base class 64 for sampling data, i.e., a TakeSample( ) command, which returns data of type Value 58. Three example classes that could be derived from the sampler base class 64 are also shown in the figure, e.g., an ExecSampler class 66 has as members: itsCommandLine of type string and the TakeSample command of type Value 58. The ExecSampler 66 executes the itsCommandLine command and interprets the value returned to be value of type itsType, that can be found in its base class sampler 64.

An SNMPSampler 68 class reads a value from an existing SNMP agent. The agent from which the SNMPSampler 68 reads this value is specified by SNMPSampler 68 members: itsCommunity, itsHost, and itsSNMPAddress, each of type String. An IndirectSNMPSampler 70 class is itself derived from the SNMPSampler 68 class as shown in FIG. 4. The Indirect SNMPSampler 70 effects a sampling of targeted data by reading an SNMP array of values defined by member itsListAddr, a String type. The array of SNMP addresses read from itsListAddr is then compared to the itsTarget value and a match is found between the itsTarget value and a value held in the itsListAddr array. Since the itsListAddr is an array, an index number of the method element between the itsListAddr and itsTarget is then used to direct the IndirectSNMPSampler to the appropriate address where the TakeSample member is invoked. Further classes may be derived from the Sampler 64 class, as indicated by the open association 72.

Figure 5:
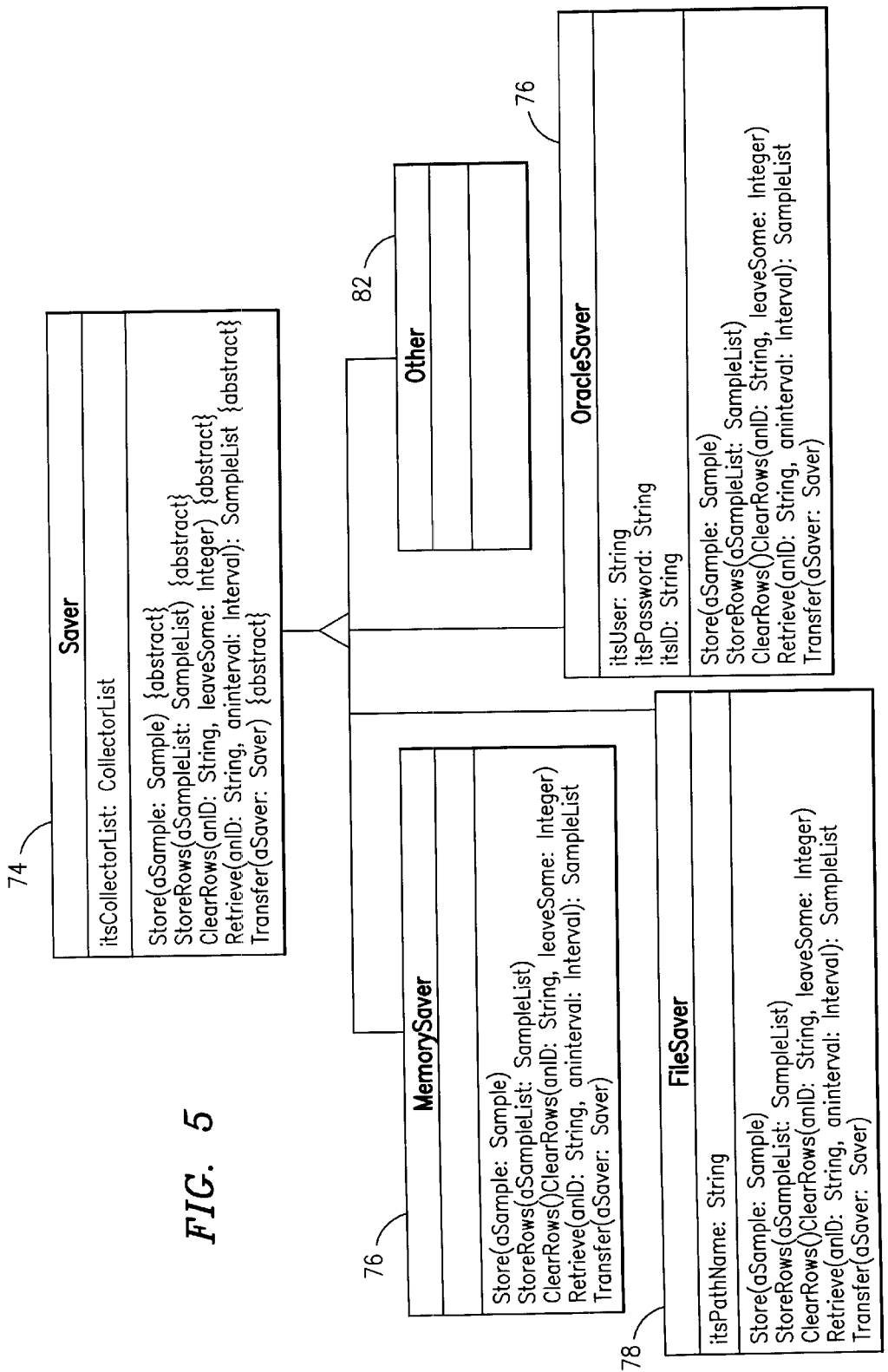
FIG. 5 illustrates an exemplary Saver Object class and other classes with associated functionality.

With reference now to FIG. 5, there is illustrated a Saver class 74 and its associated classes. The class Saver 74 is itself an abstract base class that specifies valid members that may be used for restoring and retrieving data samples. The Saver 74 class member itsCollectorList stores a list of references to specific Collector Objects that store information in the Saver 74. For example, the Store command is used to store a single value of type Sample 62. The Store command uses the Sample's ID and Interval as key values. The StoreRows command is used to store a SampleList 60. The ClearRows command clears the stored samples from a monitor, the specific monitor specified by the identifier anId. Sampled data not to be removed from invocation of the ClearRows command are specified by the LeaveSome delimiter. The Retrieve command retrieves a SampleList, i.e., the SampleList to be retrieved specified by monitor identification anId and a time interval over which the SampleList is to include, this interval specified by an identifier anInterval. Transfer is a method to copy samples from the current Saver Object to another Saver Object, the recipient Saver Object being specified by the Saver identifier aSaver.

Three example Saver classes derived from the Saver 74 abstract base class are shown in FIG. 5. MemorySaver 76 may store samples in main memory. FileSaver 78 is an example Saver class that may store samples in a file. OracleSaver 80 is a Saver class that may store samples in an Oracle database. Other Saver classes may be derived from the Saver 74 abstract base class as shown by the open class association 82.

Figure 6:
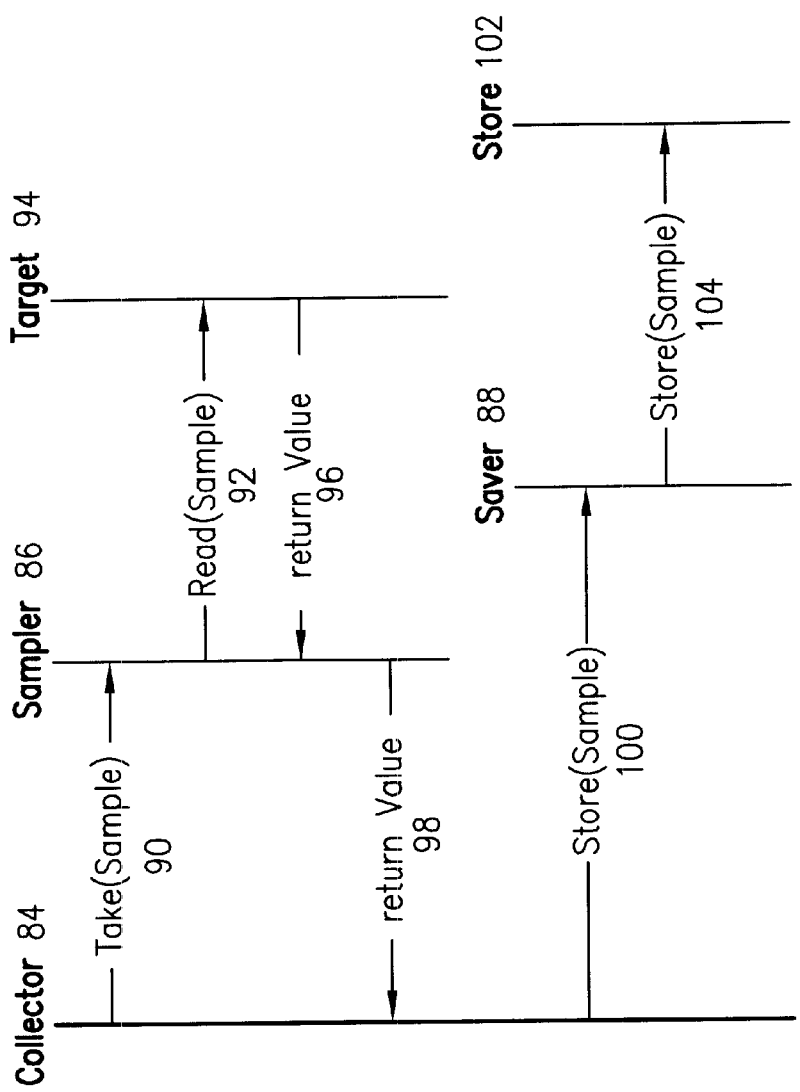
FIG. 6 illustrates a chronology of operations for implementing Collector Object data collection and storage pursuant to an embodiment of the present invention.

With reference now to FIG. 6, there is illustrated an event chronology depicting the taking and storing of samples by a give Collector Object set forth in the present invention. The objects involved in taking and storing of samples include a Collector Object 84, a Sampler Object 86, and a Saver Object 88. The event is initiated at the Collector Object 84, which sends a TakeSample command 90 to the Sampler Object 86, instructing the Sampler Object 86 to take a sample. The Sampler Object 86 then sends a target specific command to read a sample depicted herein as ReadSample 92. The appropriate target 94 then forwards the requested sampled data Value 96 back to the Sampler Object 86 and then on to the Collector Object 84 by a return path 98. The Collector Object 84 then adds a TimeStamp and a monitor identifier (anId) to the sampled data. Discrete sampled data and corresponding TimeStamp and monitor identifier are then forwarded 100 to the aforementioned Saver Object 88 in the form of a Sample 62 value. The data is then stored in a physical storage device 102 by an appropriate path 104 linking the Saver Object 88 and the Storage Device 102.

Figure 7:
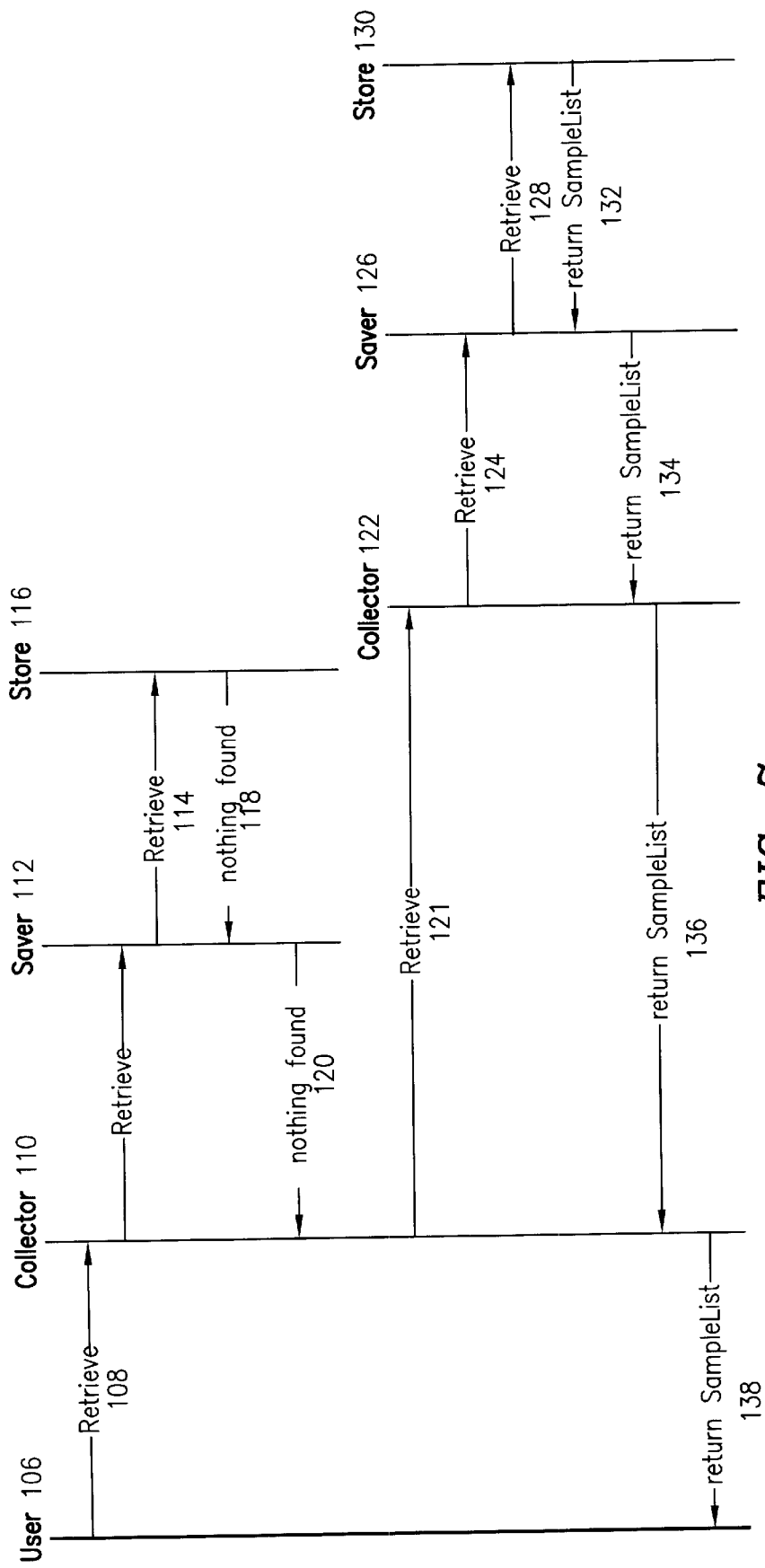
FIG. 7 illustrates an object modeling technique chronology of an example of query processing.

With reference now to FIG. 7, there is illustrated an object modeling technique chronology of the processing of a query, e.g., to root node 16 in FIG. 1. Such a query is initiated by a User 106, who starts the query by issuing a Retrieve command 108 to a root the Collector Object 110, which is atop the Collector Object hierarchy. This object selects a particular Collector Object to forward the query to by reading the first component of the name, or identifier, in the query message. Once the query is received by the aforementioned particular Collector Object, the query is then forwarded to a Saver Object 112 associated with that particular Collector Object. Saver Object 112 then formulates a store-specific query in the form of a Retrieve command 114 and sends the Retrieve command 114 to a Store Object 116 associated therewith, which in this example does not contain the data concerning the query. Store Object 116 then sends a message 118 to the Saver Object 112 indicating that the queried data is not located at the corresponding Store Object 116.

Saver Object 112 sends a message 120 to the Collector Object 110, which then redirects 121 the query to another Collector Object one level lower in the Collector Object hierarchy, in this case another Collector Object 122. Collector Object 122 then forwards a Retrieve command 124 to a Saver Object 126 associated with the Collector Object 122. Saver Object 126 subsequently forwards a Retrieve command 128 to a Store Object 130, which contains the data being queried. This data, SampleList, is then forwarded via a return message 132 back to the Saver Object 126, which in turn forwards (step 134) the SampleList to the Collector Object 122, which then propagates (step 136) the SampleList up a level in the hierarchy to the aforementioned Collector Object 110, where the SampleList is finally returned (step 138) to the User 106, via the CollectorList object (not shown).

Figure 8:
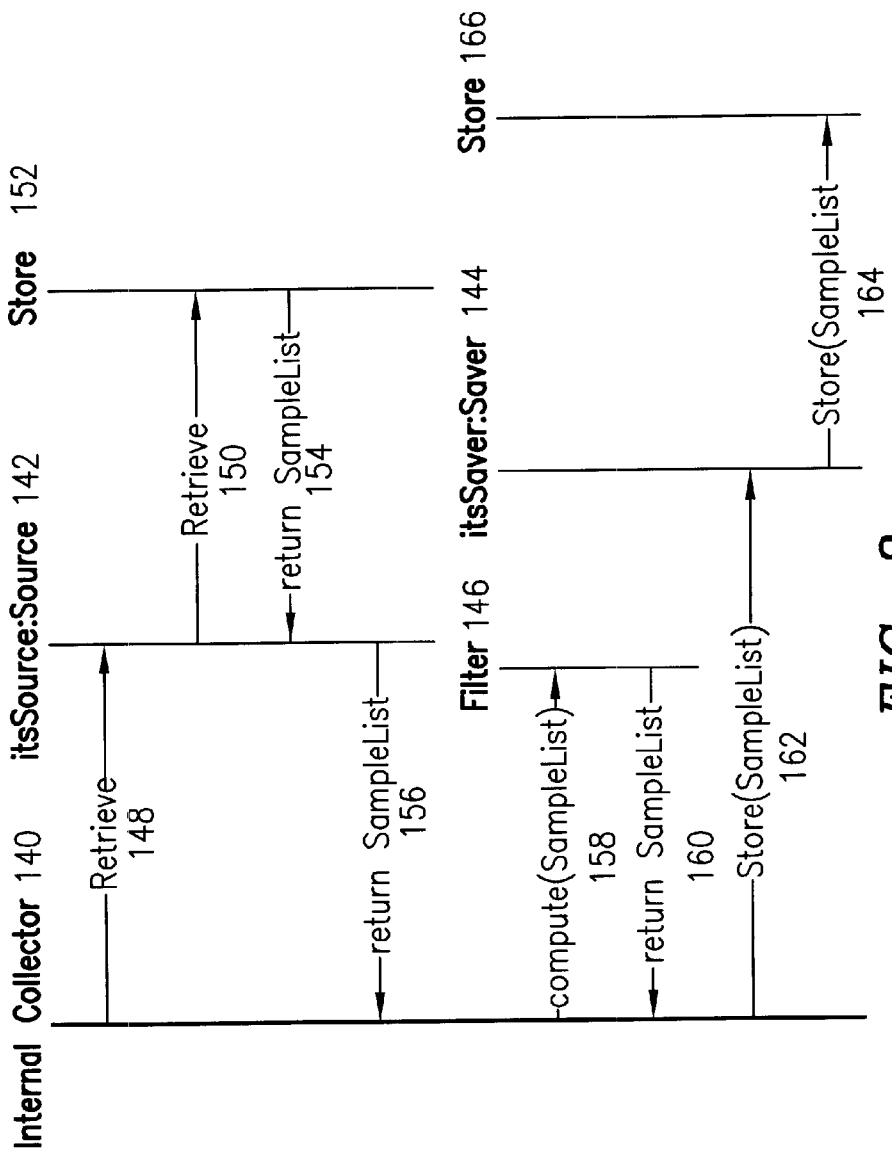
FIG. 8 illustrates a propagation and storage chronology of a SampleList by an Internal Collection Object.

With reference now to FIG. 8, there is illustrated a propagation and storage chronology of a SampleList by an Internal Collector Object. In particular, the objects involved in this event include an Internal Collector Object 140, Saver Objects 142 and 144, and optionally a Filter Object 146. The event is initiated with the ICO 140 executing a Retrieve command 148 directed towards the aforementioned Saver Object 142 located a level lower in the hierarchy to retrieve a SampleList therefrom. The Saver Object 142 executes a Retrieve command 150 on a physical Store Object 152. The SampleList is then sent (step 154) from the Store Object 152 to the Saver Object 142, where the SampleList is then returned (step 156) to the ICO 140. The event may end here, or an aggregation function may be derived from the retrieved SampleList by use of the aforementioned Filter Object 146. If data filtering is invoked, the ICO 140 forwards (step 158) the SampleList to the Filter Object 146, which then performs or computes an aggregation function on the SampleList, at which time the SampleList is most likely altered in some manner. The new SampleList is then returned (step 160) to the ICO 140 where it is sent to a targeted Saver Object, i.e., the aforementioned Saver Object 144, by execution of a Store command 162. Saver Object 144 then saves (step 164) the data at a physical Store Object 166.

Although preferred embodiments of the system and method of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A computer system for distributing system data across a multiplicity of interconnected system resources, said computer system comprising:

a multiplicity of interconnected collection objects corresponding to said multiplicity of interconnected system resources, each said collection object comprising:

retrieval means for retrieving system data from a multiplicity of discrete target system resources;

storage means for storing system data retrieved by said retrieval means; and propagation means, within a respective one of said collection objects for propagating system data to at least one other of said collection objects, whereby said system data is distributed across said multiplicity of interconnected system resources.

2. The computer system according to claim 1, wherein said retrieval means within the respective collection objects comprises a plurality of collector objects, each said collector object retrieving respective system data from respective target system resources.

3. The computer system according to claim 1, wherein said storage means within the respective collection objects are respective saver objects, each said saver object storing respective system data retrieved by respective retrieval means from respective target system resources.

4. The computer system according to claim 3, wherein said propagation means, within a respective saver object, propagates respective system data from a respective target system resource to said at least one other collection object.

5. The computer system according to claim 1, wherein said retrieval means retrieves the system data from a given one of said target system resources periodically.

6. The computer system according to claim 1, wherein said retrieval means retrieves the system data from a given one of said target system resources upon the occurrence of a given system event.

7. The computer system according to claim 1, wherein said retrieval means retrieves the system data from a given one of said target system resources in a random manner.

8. The computer system according to claim 1, wherein said storage means is a memory component within said computer system.

9. The computer system according to claim 8, wherein the system data from at least one of said target system resources is stored within said memory component in a record structure.

10. The computer system according to claim 8, wherein the system data from at least one of said target system resources is stored within a relational database associated with said memory component.

11. The computer system according to claim 1, wherein one of said multiplicity of interconnected collection objects is a central query collection object, said propagation means within said central query collection object being deactivated.

12. The computer system according to claim 1, wherein said multiplicity of interconnected collection objects adaptively distributes the system data across said collection objects using said propagation means.

13. The computer system according to claim 12, wherein said system data is adaptively distributed across said collection objects via said propagation means after a plurality of said interconnected system resources become unavailable.

14. The computer system according to claim 1, wherein said propagation means within said respective collection object propagates system data pursuant to an adaptive methodology for said computer system, whereby system data stays resident within said respective collection object if said adaptive methodology warrants nonpropagation and propagates system data to another collection object if said adaptive methodology warrants propagation.

15. The computer system according to claim 1, wherein said multiplicity of interconnected collection objects are arranged in a hierarchical topology, a plurality of said collection objects at a first level collecting respective system data from a corresponding plurality of target system resources, the propagation means within each of said plurality of collection objects propagating the system data to a central query collection object connected to each of said plurality of collection objects.

16. The computer system according to claim 15, wherein said hierarchical topology is a tree structure, said first level of collection objects being leaf nodes and said central query collection object being a root node.

17. The computer system according to claim 15, wherein the respective propagation means within said plurality of said first level collection objects passes the respective system data to another plurality of said collection objects at least one intermediate level, the respective propagation means within said plurality of intermediate level collection objects passing the system data to said central query collection object.

18. The computer system according to claim 17, wherein said propagation means within a given one of said first level collection objects and within another one of said at least one intermediate level collection objects each comprise a filter means for modifying the respective system data retrieved by the respective retrieval means, the modified system data being propagated by the respective propagation means.

19. The computer system according to claim 18, wherein said filter means is an operator selected from the group consisting of an average, minimum, maximum, median, modal and other numerical derivatives.

20. The computer system according to claim 15, wherein said propagation means within a given one of said collection objects comprises a filter means for modifying the system data retrieved by said retrieval means from at least one of said target system resources, the modified system data being propagated to another of said collection objects at a higher level.

21. The computer system according to claim 20, wherein said filter means is an operator selected from the group consisting of an average, minimum, maximum, median, modal and other numerical derivatives.

22. The computer system according to claim 1, further comprising:

query means for querying about particular system data stored within said computer system, said query means searching through said interconnected collection objects for said particular system data.

23. The computer system according to claim 22, wherein said query means first queries a central query collection object to which all of the remaining collection objects are connected, said computer system returning the particular system data from said central query collection object if said particular system data is therein, said computer system otherwise initiating a search through said remaining collection objects for said particular system data, which upon being located is propagated to said central query collection object for retrieval by said query means.

24. A method for distributing system data across a multiplicity of interconnected system resources, said method comprising the steps of:

retrieving, by a given collection object, system data from at least one of a plurality of target system resources, a multiplicity of said collection objects being interconnected and corresponding to said multiplicity of interconnected system resources;

storing the system data retrieved by said given collection object; and propagating the system data from said given collection object to at least one other of said collection objects.

25. The method according to claim 24, wherein, in said step of retrieving, the system data is retrieved from said at least one target system resource by a collector object within said given collection object.

26. The method according to claim 25, wherein each said collection object comprises a plurality of collector objects, each said collector object retrieving respective system data from respective target system resources.

27. The method according to claim 24, wherein, in said step of storing, the system data from said at least one target system resource is stored by a saver object within said given collection object.

28. The method according to claim 27, wherein each said collection object comprises at least one of said saver objects, each said collector object storing respective system data from respective target system resources.

29. The method according to claim 27, wherein in said step of propagating, said saver object within said given collection object propagates the system data from said at least one target system resource through said given collection object to at least one other collection object.

30. The method according to claim 29, wherein each said saver object propagates respective system data from respective target system resources to respective at least one other collection objects.

31. The method according to claim 24, wherein said step of retrieving is performed periodically.

32. The method according to claim 24, wherein said step of retrieving is performed upon the occurrence of a given system event.

33. The method according to claim 24, wherein said step of retrieving is performed randomly.

34. The method according to claim 24, wherein in said step of storing, the system data retrieved by the given collection object is stored in a memory component within said computer system.

35. The method according to claim 34, wherein the system data is stored within said memory component in a record structure.

36. The method according to claim 34, wherein the system data is stored within a relational database associated with said memory component.

37. The method according to claim 24, wherein one of said multiplicity of interconnected collection objects is a central query collection object, said step of propagating by said central query collection object being deactivated.

38. The method according to claim 24, wherein said steps of retrieving, storing and propagating are adaptive, adaptively distributing the system data across said collection objects.

39. The method according to claim 38, wherein the adaptive steps of retrieving, storing and propagating distribute the system data across said collection objects after a plurality of said interconnected system resources become unavailable.

40. The method according to claim 24, wherein said step of propagating propagates system data pursuant to an adaptive methodology for said computer system, whereby system data stays resident within said given collection object if said adaptive methodology warrants nonpropagation and propagates to another collection object if said adaptive methodology warrants propagation.

41. The method according to claim 24, wherein said multiplicity of interconnected collection objects are arranged in a hierarchical topology, said given collection object in said step of retrieving being one of a plurality of first level collection objects, said first level collection objects retrieving respective system data from a corresponding plurality of target system resources.

42. The method according to claim 41, wherein said plurality of said first level collection objects propagate the respective system data to a central query collection object.

43. The method according to claim 42, wherein said hierarchical topology is a tree structure, said first level collection objects are leaf nodes and said central query collection object being a root node.

44. The method according to claim 42, wherein said plurality of said first level collection objects passes the respective system data to another plurality of said collection objects at least one intermediate level, said step of propagating further comprising propagating the respective system data from said at least one intermediate level collection objects to said central query collection object.

45. The method according to claim 44, wherein said step of propagating further comprises a second filtering of the filtered system data retrieved by said at least one other collector object from said given collector object.

46. The method according to claim 24, wherein said step of propagating further comprises filtering the system data retrieved by said given collection object from said at least one target system resource, the filtered system data being propagated to said at least one other collector object.

47. The method according to claim 46, wherein said step of filtering modifies said system data, said filtration operation being selected from the group consisting of an average, minimum, maximum, median, modal and other numerical derivatives.

48. The method according to claim 24, further comprising the step of:

responding to a query about particular system data stored within said computer system, said query response searching through said interconnected collection objects for said particular system data.

49. The method according to claim 48, wherein said query queries a central query collection object to which all of the remaining collection objects are connected, said computer system returning the particular system data from said central query collection object if said particular system data is therein, said computer system otherwise initiating a search through said remaining collection objects for said particular system data, which upon being located is propagated to said central query collection object for retrieval.

50. A system for monitoring components operating on a network, said system comprising:

a plurality of collection objects being associated with at least one component, said collection object operating to gather data indicative of operational information of the associated at least one component;

at least one saver object in communication with at least one of said collection objects, the at least one saver object receiving and storing the data from the at least one of said collection objects; and an internal collection object in communication with said at least one saver object, said internal collection object operating to gather the data stored by said at least one saver object.

51. The system according to claim 50, further comprising at least one second saver object in communication with said internal collection object, the gathered data being stored by the at least one second saver object.

52. A method for monitoring components operating on a network, said method comprising:

collecting a plurality of data elements indicative of operational information from a plurality of components operating on a first level on the network;

storing the plurality of data elements collected from the plurality of components operating on the first level on the network;

gathering the stored plurality of data elements; and storing the plurality of data elements on a second level on the network.

53. The method according to claim 52, wherein the levels are organized hierarchically.

54. The method according to claim 52, further comprising querying the components for particular data elements.

* * * * *